US006998170B2

(12) United States Patent
Balmer et al.

(10) Patent No.: US 6,998,170 B2
(45) Date of Patent: Feb. 14, 2006

(54) JASPE PATTERN FLOORING

(75) Inventors: Richard H. Balmer, Manheim, PA (US); Donald L. Kurtz, Lititz, PA (US); David R. Wilcox, Mountville, PA (US)

(73) Assignee: AWI Licensing Company, Wilmington, DE (US)

( * ) Notice: Subject to any disclaimer, the term of this patent is extended or adjusted under 35 U.S.C. 154(b) by 422 days.

(21) Appl. No.: 09/977,170

(22) Filed: Oct. 12, 2001

(65) Prior Publication Data

US 2003/0077431 A1 Apr. 24, 2003

(51) Int. Cl.
*B32B 31/00* (2006.01)
*B27N 3/00* (2006.01)
*B44C 1/00* (2006.01)

(52) U.S. Cl. ................ 428/221; 156/308.2; 156/308.4; 156/63; 264/109; 264/112; 428/323; 428/327

(58) Field of Classification Search .................. 156/63, 156/293, 304.6, 308.4, 309.6; 428/44, 57, 428/323, 327, 364
See application file for complete search history.

(56) References Cited

U.S. PATENT DOCUMENTS

| | | | | |
|---|---|---|---|---|
| 3,038,828 A * | 6/1962 | Yakubik | ..................... | 428/142 |
| 3,192,294 A | 6/1965 | Streed et al. | ................. | 264/54 |
| 3,359,352 A | 12/1967 | Powell et al. | ................. | 264/47 |
| 4,923,658 A * | 5/1990 | Hover et al. | .................. | 264/76 |
| 5,635,266 A | 6/1997 | Quinn et al. | .................. | 428/57 |
| 5,712,032 A | 1/1998 | Balmer et al. | .............. | 428/364 |
| 5,955,173 A | 9/1999 | Balmer et al. | .............. | 428/142 |

FOREIGN PATENT DOCUMENTS

| | | | |
|---|---|---|---|
| EP | 0888859 | * | 1/1999 |
| GB | 2056462 | * | 3/1981 |
| JP | 56-4424 | * | 1/1981 |
| JP | 5-125356 | * | 5/1993 |

* cited by examiner

*Primary Examiner*—Jeff H. Aftergut
*Assistant Examiner*—Justin R. Fischer

(57) ABSTRACT

Disclosed are both a method and composition for providing a flooring visual by agglomeration of components. The flooring visual is comprised of a jaspe or marble like finish. The agglomerated mix may be formed into welding rods or into decorative sheets. The decorative sheets may be seamed with the welding rods.

30 Claims, 4 Drawing Sheets

JASPE PATTERN FLOORING

FIELD OF THE INVENTION

The present invention relates generally to surface coverings and in particular to a decorative laminate covering and welding rod.

BACKGROUND

Sheets of resinous compositions have found widespread use as decorative and wear resistant coverings for a wide range of products. For example, decorative coverings can include coverings for flooring, walls, ceilings, desks, tables and countertops. Additionally, such resinous compositions can be incorporated into surface layers on leather, fabrics, paper, wood, metal and glass, or used in upholstery, drapery, and clothing materials. Sheet materials can also be made with chips or other particulate material.

Additionally, seams are created when two sheets are joined in the application of resinous sheets to a floor. The seams can create an unappealing visual. The healthcare industry typically requires a seamless flooring product for sanitation reasons since seams can trap dirt and germs. To achieve a seamless flooring product, seams can be heat welded by typically using a welding rod formed from a vinyl product. Often, it is desirable to have a matching patterned weld rod to help hide the seams when the floors are installed.

Many methods have been employed to make a through-color visual which extends all the way from the surface down through the entire wearlayer in an uninterrupted fashion. Such methods include through-color printing of inks or plastisols into sintered dryblends or other aggregate mixes, while others lay up entire layers of various types of mix components. This can be done on conventional roll press lines or with stencils to create patterned visuals. In still other instances, surfaces may be interrupted. Some manufacturers choose to emboss patterns and print inks, either valley print or flood and wipe the sheet with coatings of various compositions to create different decorative visuals. Some float materials in fluids and deposit the material as wearlayer slurries, and still other techniques are used to create various differential gloss visuals. Many times the visuals are random and sometimes they are geometric.

In other cases, the visuals may not be through-color, but may be made as printed layers with subsequent protective coating layers or calendered layers to protect the decorative flooring print image. In such cases, many times there is a scrap backing layer beneath the printed image to reduce costs, or there may also be a calendered base layer. These structures may be either homogeneous or they may be layered composites. In these cases, it is advantageous to come up with a pattern weld rod that matches these non-through-color visuals and patents are pending to describe this process. The visual of the seam for these floors does not camouflage the seam very well when a through-color rod is used on a non-through-color flooring structure; the converse is also true.

SUMMARY

The present invention provides a flooring visual by utilizing jaspe agglomerated particles. The flooring visual may be comprised of almost any pattern, such as a jaspe or marble like finish. The jaspe agglomerated particles may be formed into welding rods or into a decorative sheet. The jaspe agglomerated particles may comprise a heterogeneous mixture of at least two visually distinct regions of polymeric materials such as polyvinyl chloride (PVC). The jaspe agglomerated particles may be consolidated to form either the welding rod or the decorative sheet. Additionally, a decorative floor is provided wherein the seams forming the floor are filled with the consolidated jaspe agglomerated particles.

The present invention includes, in part, a thermoplastic welding rod comprising jaspe agglomerated particles. The welding rod includes multiples of at least one jaspe agglomerated particle consisting of visually distinct regions which are processed to form a jaspe or marbled finish. The regions of polymeric materials may exhibit a variety of colors, shades, number average molecular weights, particle sizes or other visually distinct characteristics, which provide a striking appearance when mixed and formed into the thermoplastic welding rod. The polymeric materials may comprise a thermoplastic, such as polyvinyl chloride (PVC), or other flooring polymeric material such as linoleum.

In a further embodiment, the invention includes a method of making a flooring and thermoplastic welding rods by agglomerating a first mixture including at least one polymeric material to form a first agglomerated particle. The first agglomerated particle is then combined with a second mixture including at least one polymer material and then agglomerated into a second agglomerated particle having regions of different visual characteristics to form a jaspe agglomerated particle. The first agglomerated particle can be ground or otherwise processed to change its particle size if desired before being mixed with the second mixture.

Additionally, the first agglomerated particle can be mixed with a second mixture that can also comprise jaspe agglomerated particles. In this embodiment, the first agglomerated particles and the jaspe agglomerated particles are combined and agglomerated to produce a different jaspe agglomerated particle. The jaspe agglomerated particle can then be processed to produce a flooring structure or thermoplastic welding rod having a different jaspe or marbled appearance. This process may also continue to produce jaspe agglomerated particles comprising multiple regions of visual distinction. The agglomerated particles may include a thermoplastic, such as polyvinyl chloride, or other flooring polymeric materials such as linoleum.

In another embodiment, the welding rod and flooring product can be composed of a mixture of multiples of at least two jaspe agglomerated particles. Additionally, various mixtures and sizes of jaspe agglomerated particles can be employed to make flooring and welding rod visuals.

A surface covering having the appearance of a jaspe and/or marbled finish is also encompassed by the present invention. The surface covering includes a layer of at least one visually distinct jaspe agglomerated particle.

A further embodiment includes a method of making a surface covering by consolidating the layer of jaspe agglomerated particles into a surface covering. The consolidating step may include a variety of steps for forming surface coverings, such as, for example, calendering, pressing and thermo fixing.

The present invention also is directed to a seamed surface covering including at least two surface covering sheets welded together with a thermoplastic welding rod. The thermoplastic welding rod comprises at least one jaspe agglomerated particle. The thermoplastic welding rod has an appearance of a jaspe finish and/or marbled finish. The surface covering may also comprise jaspe agglomerated particles and when seamed with the same jaspe welding rod produce a visually acceptable seam. The welding rod and surface covering visual do not need to match, if a different accent visual from the welding rod is desired or is used to develop a planned visual effect.

DETAILED DESCRIPTION

Figure 1:
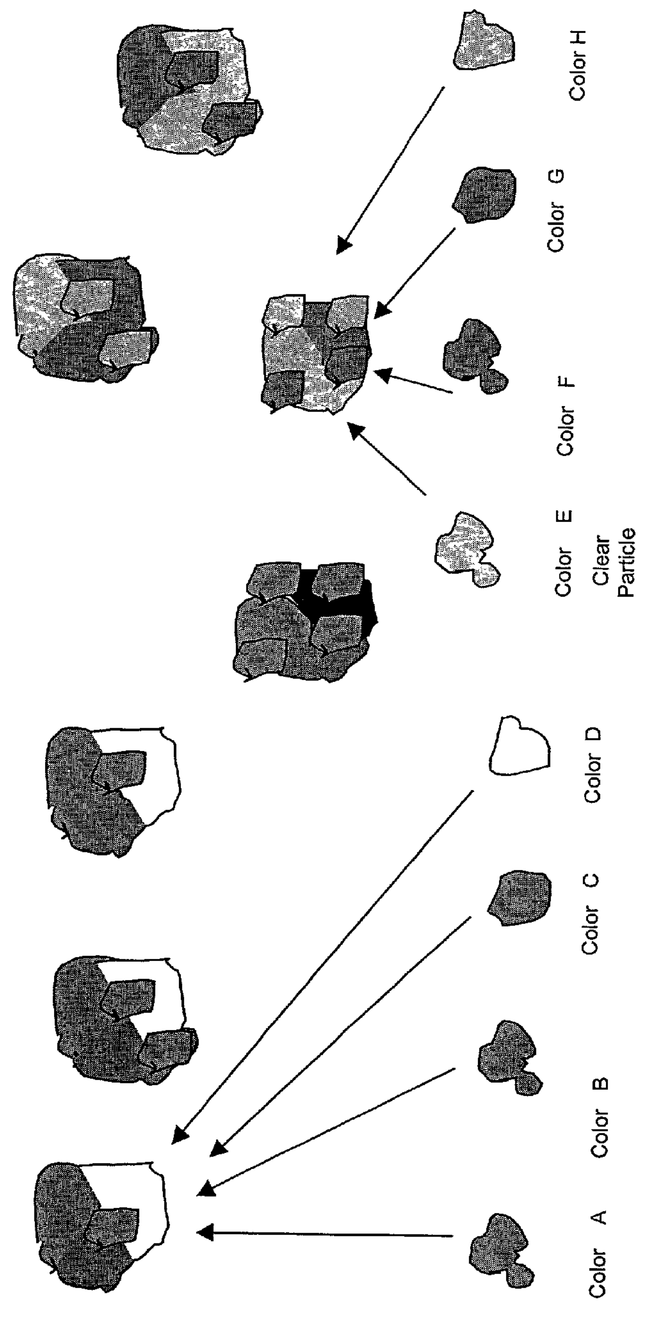
FIG. 1 is a perspective view of jaspe agglomerated particles.

The present invention provides a flooring visual by utilizing jaspe agglomerated particles. The flooring visual may be comprised of almost any pattern, such as a jaspe or marble like finish. The jaspe agglomerated particles may be formed into welding rods or into a decorative sheet. The jaspe agglomerated particles may comprise a heterogeneous mixture of at least two visually distinct polymeric materials such a polyvinyl chloride (PVC). The jaspe agglomerated particles may be consolidated to form either the welding rod or the decorative sheet. Additionally, a decorative floor is provided wherein the seams forming the floor are filled with the consolidated jaspe agglomerated particles.

The term "jaspe finish or visual" is intended to include all decorative patterns having a striped or streaked appearance. This appearance may be accomplished using various shades of one color or multiple colors.

One process of making agglomerated particles is described in the examples and results from compaction and agglomeration in a die-head. The length and shape of the agglomerated particles may be modified by changing the die-head or the knife cutting speed or distance from the die. The agglomerated particles may then be put through a series of different grinder screens to produce the desired particle size.

In one embodiment, solid-colored, agglomerated particles are mottled or blended with at least one other different colored agglomerated particle and then agglomerated a second time. This results in multi-colored, jaspe agglomerated particles. The jaspe agglomerated particles may be formed into various lengths and shapes. Additionally, the jaspe agglomerated particles may be ground using any standard grinding equipment to create different sizes of multi-colored, jaspe agglomerated particles for creating different visuals. The agglomerated jaspe particles can also be fed through a mill or calender to create sheets of multi-colored mix which could be further ground into chips to create a jaspe chip. Furthermore, to gain visual depth, substantially clear polymer resin or agglomerated clear particles may be used to make jaspe agglomerated particles. Additionally, jaspe agglomerated particles may be surrounded or coated with clear or colored resin prior to consolidation to help maintain separation between the particles. Furthermore, the jaspe agglomerated particles may comprise other materials for added decorative effects, such as polymer regions having different molecular weights (PVC or otherwise), and different compositions, such as polyvinylacetate (PVA) or other polymers.

Additionally, blends may use various combinations of sizes, shapes, clears, translucents, opaques, and pearlescents. Furthermore, other materials may be blended for added decorative effects, such as polymers having different molecular weights (PVC or otherwise), and different compositions, such as PVA or other polymers. By varying the size of the agglomerated particles and the jaspe agglomerated particles, new visuals can be achieved which impart an impressionistic appearance. The same blend of agglomerated particles can be used to form a welding rod or a flooring product.

EXAMPLES

Example 1

Preparation of Single Color Agglomerates

A mix of powdered vinyl resin, plasticizer, calcium carbonate filler, stabilizer, and pigment was dry-blended using a small scale Henschel Blender. Other blenders, such as a Lodige or other types of mixers, may be used. The dry blended powder was then fed into an LCI Agglomeration Unit (Pellet Press Model 14-175) using a 3 mm die having a 12 mm pressway length. The runs were made with the rotating knife positioned about 2 mm below the die-head. The knife position may be changed to make longer and shorter agglomerates. At a rate of about 50 kilos/hour with a machine rotation rate of about 100 rpm, formed agglomerated powders from the machine were received at a rate of about 640 grams/minute (about 85 pounds per hour) and were about 6–10 mm in length having a somewhat irregular shape.

Formulations Table:

The following basic formulation (parts by weight) was employed to make the agglomerated particles.

| | |
|---|---|
| PVC Homopolymer Resin | 59.5% |
| Diisohepyl Phthalate | 11% |
| Disononyl Phthalate | 13% |
| Epoxidized Soya Oil | 2% |
| Dioctyl Adapate | 2% |
| Stabilizer | 1.5% |
| Calcium Carbonate | 11% |

To this basic formulation above, a pigment was added at a level of about 2% by weight to produce the following colored agglomerated particles.

| | Pigment color |
|---|---|
| A | Green |
| B | Blue |
| C | Red |
| D | White |
| E | No Pigment Used (Clear) |

Example 2

Preparation of Jaspe Agglomerated Particles

Figure 2:
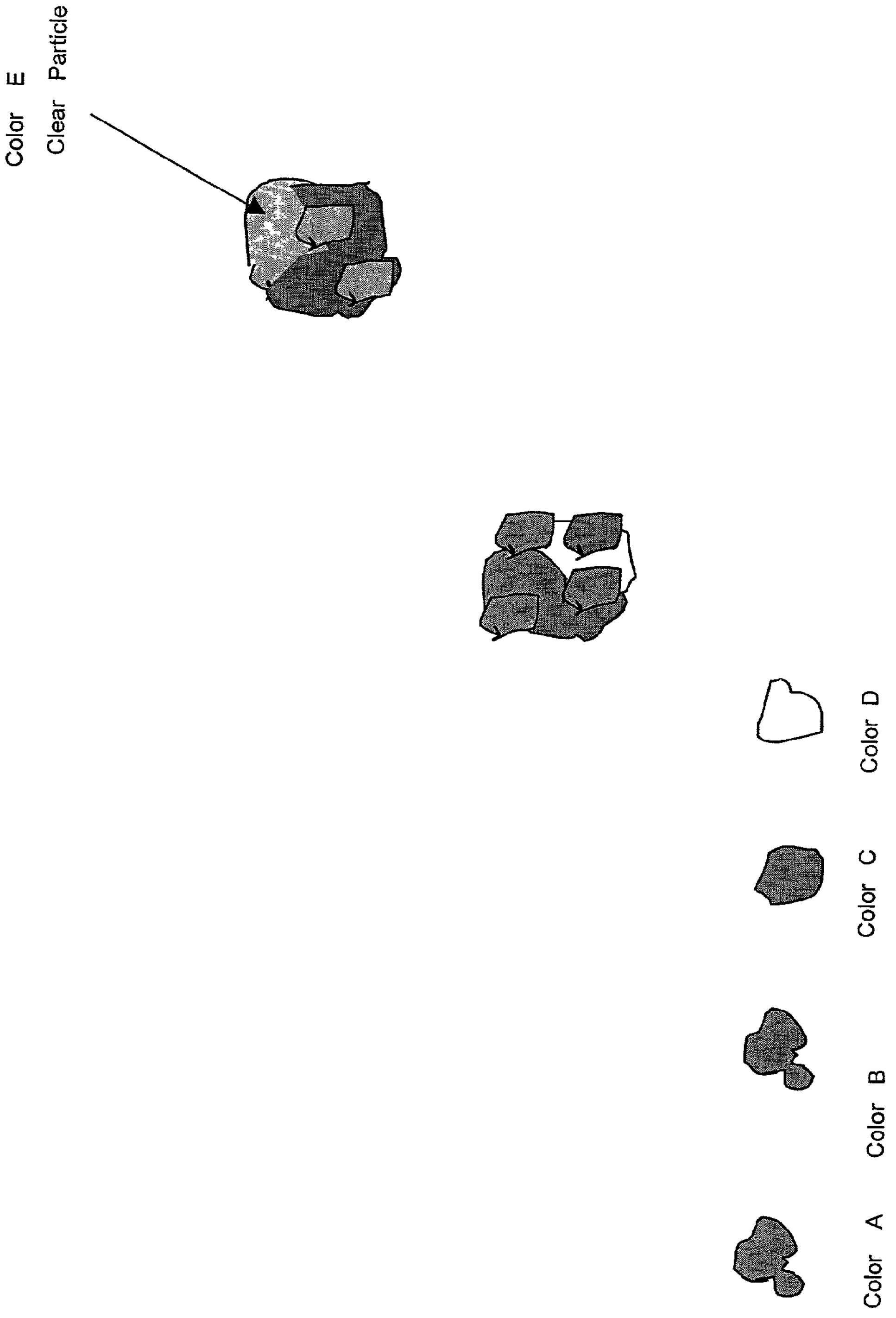
FIG. 2 is a further perspective view of embodiments of the jaspe agglomerated particles.
Figure 3:
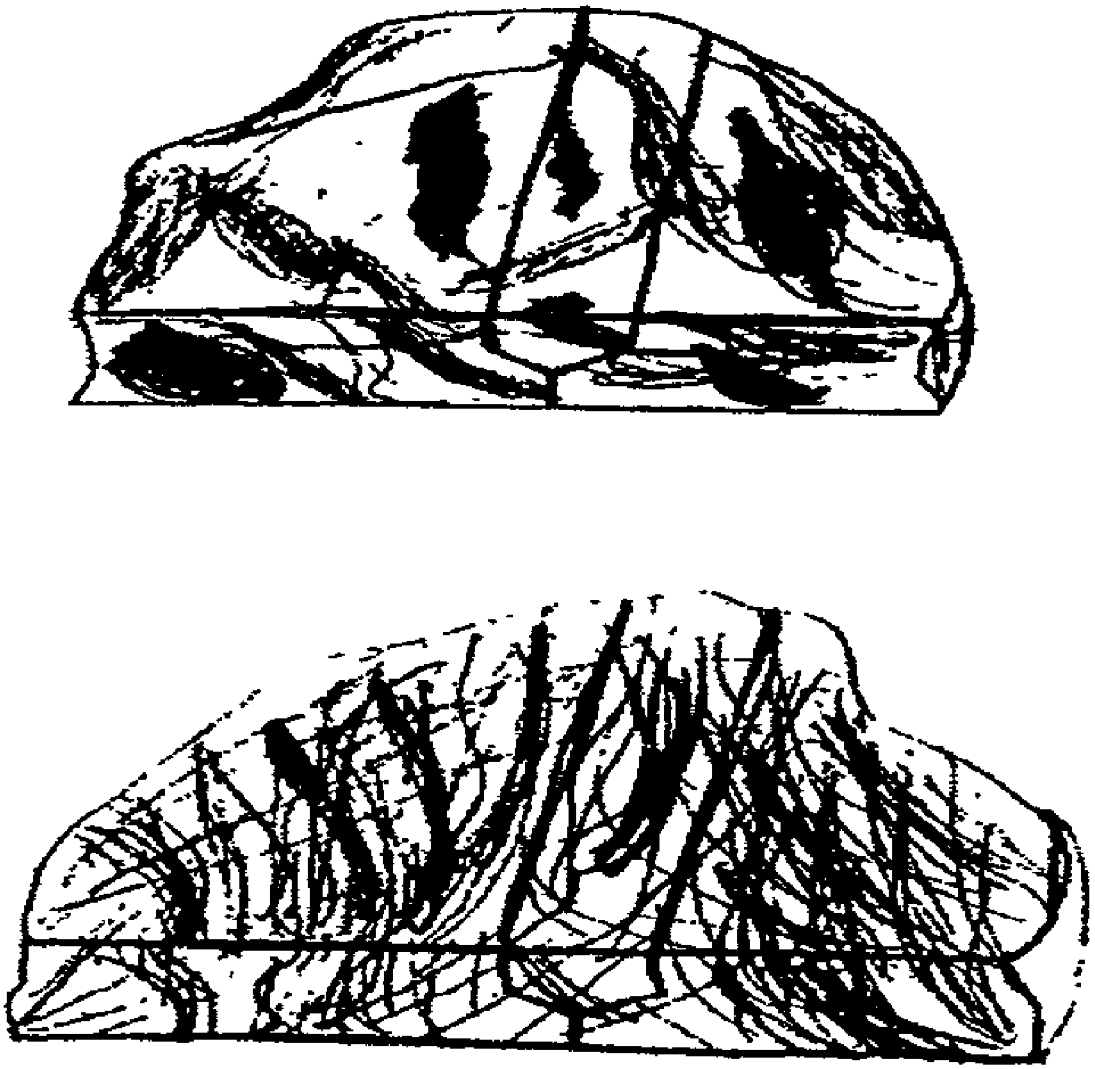
FIG. 3 is a perspective of floor and welding rod pattern options.
Figure 4:
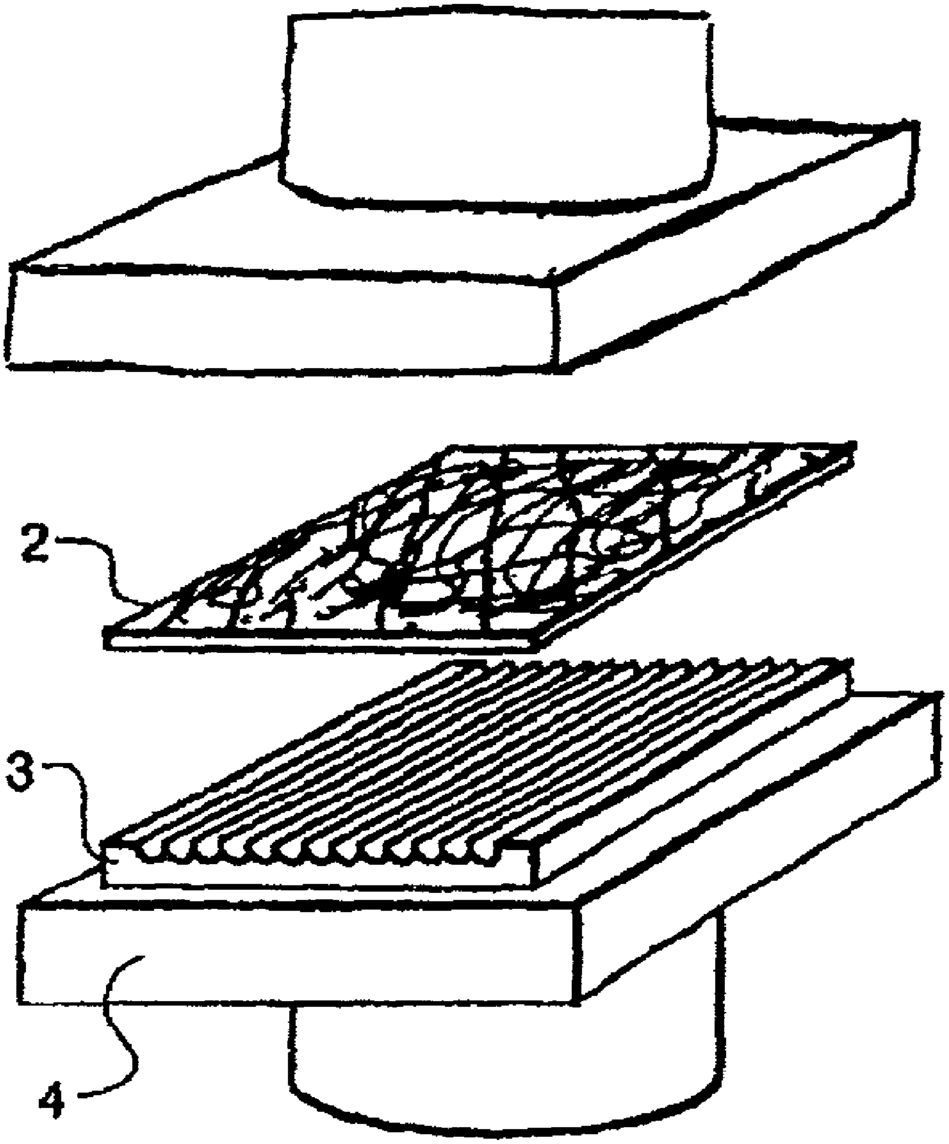
FIG. 4 is an exploded view of a thermoplastic welding rod molding press and the agglomerated component thermoplastic weld rod material disposed therein.

A. 8.3% of each accent colors A, B, and C were physically blended with 75.1% base color D and fed into the LCI Agglomeration unit used in Example 1 using the die having a 12 mm pressway length. The feed rate was varied, with a slower rate helping to prevent the mix from piling up over the top of the die. This was run at about 100 pounds per hour at 3.5–4.0 amps. The resulting jaspe agglomerated particle was a varigated multi-colored blend of the different colors as shown in FIG. 2.

B. 16.3% of each of the accent colors A, B and C were used with 51.1% of base color D and were blended and processed as in Example 2A providing a different jaspe agglomerated particle.

C. This is the same as example 2B except that a knife cutter was not used, and the longer lengths of agglomerated color were collected.

D. In this example, four different accent colors A, B, C and E were used in combination with base color D to produce two jaspe agglomerated particles at two different mottling ratios, both of which had more base color using an 80/20 blend and a 70/30 blend. In either case, the latter number was the total percentage of accent color. For the 20% accent loading level, all four colors, each at 5% individual loading were used. For the 30% accent level, 7.5% of each color by weight and a 9 mm die pressway length instead of 12 mm were used.

Example 3

Preparation of Jaspe Sheet Flooring

The jaspe particles from Example 2B were used to create a flooring structure. About 375 grams of jaspe agglomerated particles in Example 2B were used to fill a 14×14 frame (inside diameter) at about 116 mils in thickness that was placed upon a release flooring felt backing. The surface of the jaspe particle layer was smoothed with roller bars and vibration. The loose mix was covered with release paper and a thin metal plate, and placed in a press with top and bottom platens at 300° F. The samples were then pressed first for ½-minute at 8.0 force pounds, and then switched to a higher pressure, 30 minutes at 40 force pounds. While still under pressure, the samples were cooled down for another 3–5 minutes. After stripping from the release carrier, a homogeneous flooring structure with a new marble-like visual was obtained.

Example 4

Welding Rod Formation

The formed jaspe sheet on Example 3 on the release felt was pressed and molded into patterned welding rods. The sheets were positioned face down over the weld rod mold (½-round) with temperatures of both platens at 325° F. The sheets were heated for about 2 minutes and then pressed for about 1.5 minutes at about 4.0 force pounds. Again, the molded sheet was cooled down under pressure for about 3–5 minutes until the sheet was about 150° F. The press was opened and the release paper was stripped from the top of the sheet. The molded weld rod was removed, and the sheet was slit into individual pattern welding rod strands. These individual strands of patterned welding rod were then used to make welded seams between two samples of flooring product made from Example 3. An acceptable seam visual was obtained.

Example 5

Grinding of Jaspe Agglomerated Particles

The agglomerated accent color particles as well as the jaspe agglomerated particles can be physically ground to reduce their size. Using different size accent agglomerated particles to make jaspe agglomerated particles changes the physical composition of the jaspe agglomerated particles and imparts a different visual effect.

Additionally, the size of the agglomerated particles can also be varied such as in Example 2C or subsequently ground to reduce particle size. This difference in particle size results in significantly different visuals Different and sharper visuals were achieved by cold grinding the jaspe agglomerated particles. The agglomerated particles were first frozen by subjecting them to dry ice or cold nitrogen and then processed through a Fitz Mill Grinder using a 3A screen (3/16) on high speed.

While specific embodiments are set forth as illustrated and described above, it is recognized that variations may be made with respect to the disclosed embodiments. For example, these jaspe agglomerated particles can be utilized in combination with traditional chips and particles in may ways. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A sheet comprising a consolidated layer formed from a blend, the blend comprising a first plurality of jaspe agglomerated particles, wherein the jaspe agglomerated particles of the first plurality of jaspe agglomerated particles comprise a first particle from a first plurality of particles having a first visual characteristic and a second particle from a second plurality of particles having a second visual characteristic different than the visual characteristic of the first particle and wherein all of the surfaces of the jaspe agglomerated particles are irregular.

2. The sheet of claim 1, wherein the first plurality of particles having a first visual characteristic has an amount of filler level different from the amount of filler level of the second plurality of particles having a second visual characteristic.

3. The sheet of claim 1, wherein the first plurality of particles having a first visual characteristic includes a first material and the second plurality of particles having a second visual characteristic includes a second material different than the first material.

4. The sheet of claim 1, wherein the particles of the first plurality of particles having a first visual characteristic are transparent or translucent.

5. The sheet of claim 1, wherein the blend further comprises a second plurality of jaspe agglomerated particles, the second plurality of jaspe agglomerated particles having a visual characteristic different than the visual characteristic of the first plurality of jaspe agglomerated particles, wherein the jaspe agglomerated particles of the second plurality of jaspe agglomerated particles comprise a third particle from a third plurality of particles having a third visual characteristic and a fourth particle from a fourth plurality of particles having a fourth visual characteristic different than the visual characteristic of the first, second and third particles, and wherein all of the surfaces of the jaspe agglomerated particles of the second plurality are irregular.

6. The sheet of claim 5, wherein the particles comprising second plurality of jaspe agglomerated particles are dry blend particles.

7. The sheet of claim 6, wherein the first particle and the second particle of the first plurality of jaspe agglomerated particles are dry blend particles.

8. The sheet of claim 1, wherein all of the interfaces between jaspe agglomerated particles are labyrinthine.

9. The sheet of claim 1, wherein the first particle and the second particle are agglomerated particles.

10. The sheet of claim 1, wherein the first particle and the second particle are dry blend particles.

11. The sheet of claim 1, wherein the visually different characteristics include the first plurality of particles having a first shade of a color and the second plurality of particles having a second shade of the color.

12. A sheet comprising a consolidated layer formed from a blend, the blend comprising a first plurality of jaspe agglomerated particles, wherein the jaspe agglomerated particles of the first plurality of jaspe agglomerated particles comprise a first particle from a first plurality of particles having a first visual characteristic and a second particle from a second plurality of particles having a second visual characteristic different than the visual characteristic of the first particle, wherein the first plurality of particles having a first visual characteristic includes a first thermoplastic material and the second plurality of particles having a second visual characteristic includes a second thermoplastic material different than the first thermoplastic material, and wherein all of the surfaces of the jaspe agglomerated particles are irregular.

13. A sheet comprising a consolidated layer formed from a blend, the blend comprising a first plurality of jaspe agglomerated particles, wherein the jaspe agglomerated particles of the first plurality of jaspe agglomerated particles comprise a first particle from a first plurality of particles having a first visual characteristic and a second particle from a second plurality of particles having a second visual characteristic different than the visual characteristic of the first particle, wherein the first plurality of particles having a first visual characteristic includes a first material comprising a polymer having a first average molecular weight and the second plurality of particles having a second visual characteristic includes a second material comprising a polymer having a second average molecular weight and wherein all of the surfaces of the jaspe agglomerated particles are irregular.

14. A method of forming a sheet comprising:

forming a first plurality of jaspe agglomerated particles wherein all of the surfaces of the jaspe agglomerated particles are irregular by agglomerating a first plurality of particles having a first visual characteristic and a second plurality of particles having a second visual characteristic different than the visual characteristic of the first plurality of particles;

forming a blend comprising the first plurality of jaspe agglomerated particles; and consolidating the blend to form a layer having a jaspe visual appearance.

15. The method of claim 14, wherein the first plurality of particles and the second plurality of particles comprise a thermoplastic polymeric material.

16. The method of claim 14, wherein the blend is consolidated to form a layer by pressing in a roll press, a flat bed press or belted press.

17. The method of claim 16, wherein the roll press is a calender.

18. The method of claim 16, wherein the belted press is a double belted press.

19. The method of claim 14, wherein the first plurality of jaspe agglomerated particles is formed, a second plurality of jaspe agglomerated particles is formed, and then the first plurality of jaspe agglomerated particles is mixed to form the blend, the jaspe agglomerated particles of the second plurality of jaspe agglomerated particles having a visual characteristic different than the visual characteristic of the jaspe agglomerated particles of the first plurality of jaspe agglomerated particles, wherein the jaspe agglomerated particles of the second plurality of jaspe agglomerated particles comprise a third particle from a third plurality of particles having a third visual characteristic and a fourth particle from a fourth plurality of particles having a fourth visual characteristic different than the visual characteristic of the first, second and third particles, and wherein all of the surfaces of the jaspe agglomerated particles of the second plurality are irregular.

20. The method of claim 19, wherein the particles comprising the second plurality of jaspe agglomerated particles are dry blend particles.

21. The method of claim 20, wherein the first plurality of particles and the second plurality of particles of the first plurality of jaspe agglomerated particles are dry blend particles.

22. The method of claim 14, further comprising grinding the jaspe agglomerated particles.

23. The method of claim 14, wherein the visually different characteristics include the first plurality of particles having a first color and the second plurality of particles having a second color.

24. The method of claim 14, wherein the visually different characteristics include the first plurality of particles having a first shade of a color and the second plurality of particles having a second shade of the color.

25. The method of claim 14, wherein the particles of the first plurality of particles having a first visual characteristic are transparent or translucent.

26. The method of claim 14, wherein the particles forming the first plurality of jaspe agglomerated particles melt and flow to form a labyrinthine interface between all of the jaspe agglomerated particles during the consolidating step.

27. The method of claim 14, wherein the first plurality of particles having a first visual characteristic and the second plurality of particles having a second visual characteristic are agglomerated particles.

28. The method of claim 14, wherein the first plurality of particles and the second plurality of particles are dry blend particles.

29. The method of claim 14, wherein the first plurality of particles having a first visual characteristic has an amount of filler level different from the amount of filler level of the second plurality of particles having a second visual characteristic.

30. A method of forming a sheet comprising forming a first plurality of jaspe agglomerated particles wherein all of the surfaces of the jaspe agglomerated particles are irregular by agglomerating a first plurality of particles having a first visual characteristic comprising a first polymeric material having a first number average molecular weight and a second plurality of particles having a second visual characteristic different than the visual characteristic of the first plurality of particles comprising a second polymeric material having a second number average molecular weight, forming a blend comprising the first plurality of jaspe agglomerated particles, and consolidating the blend to form a layer having a jaspe visual appearance.

* * * * *